(12) United States Patent
Sun et al.

(10) Patent No.: US 9,411,778 B2
(45) Date of Patent: Aug. 9, 2016

(54) MULTIPROCESSOR SYSTEM AND SYNCHRONOUS ENGINE DEVICE THEREOF

(75) Inventors: Ninghui Sun, Beijing (CN); Fei Chen, Beijing (CN); Zheng Cao, Beijing (CN); Kai Wang, Beijing (CN); Xuejun An, Beijing (CN)

(73) Assignee: INSTITUTE OF COMPUTING TECHNOLOGY OF THE CHINESE ACADEMY OF SCIENCES, Beijing (CN)

( * ) Notice: Subject to any disclaimer, the term of this patent is extended or adjusted under 35 U.S.C. 154(b) by 676 days.

(21) Appl. No.: 13/819,886

(22) PCT Filed: Aug. 30, 2011

(86) PCT No.: PCT/CN2011/001458
§ 371 (c)(1),
(2), (4) Date: Feb. 28, 2013

(87) PCT Pub. No.: WO2012/027959
PCT Pub. Date: Mar. 8, 2012

(65) Prior Publication Data
US 2013/0166879 A1    Jun. 27, 2013

(30) Foreign Application Priority Data

Aug. 30, 2010    (CN) .......................... 2010 1 0267931

(51) Int. Cl.
| | | |
|---|---|---|
| G06F 15/173 | (2006.01) |
| G06F 15/76 | (2006.01) |
| G06F 9/52 | (2006.01) |
| G06F 9/30 | (2006.01) |

(52) U.S. Cl.
CPC .............. *G06F 15/76* (2013.01); *G06F 9/3004* (2013.01); *G06F 9/30087* (2013.01); *G06F 9/52* (2013.01)

(58) Field of Classification Search
None
See application file for complete search history.

(56) References Cited

U.S. PATENT DOCUMENTS 5,613,136 A * 3/1997 Casavant .............. G06F 9/3877
                                                                712/28
6,226,738 B1 * 5/2001 Dowling ............... G06F 9/3842
                                                                712/223

(Continued)

FOREIGN PATENT DOCUMENTS

| CN | 1573715 A | 2/2005 |
| CN | 1952900 A | 4/2007 |
| CN | 101950282 A | 1/2011 |

*Primary Examiner* — Michael Sun
(74) *Attorney, Agent, or Firm* — Finnegan, Henderson, Farabow, Garrett & Dunner LLP

(57) ABSTRACT

The invention discloses a multiprocessor System and synchronous engine device thereof. the synchronous engine includes: a plurality of storage queues, wherein one of the queues stores all synchronization primitives from one of the processors; a plurality of scheduling modules, selecting the synchronization primitives for execution from the plurality of storage queues and then according to the type of the synchronization primitive transmitting the selected synchronization primitives to corresponding processing modules for processing, scheduling modules corresponding in a one-to-one relationship with the storage queues; a plurality of processing modules, receiving the transmitted synchronization primitives to execute different functions; a virtual synchronous memory structure module, using small memory space and mapping main memory spaces of all processors into a synchronization memory structure to realize the function of all synchronization primitives through a control logic; a main memory port, communicating with virtual synchronous memory structure module to read and write the main memory of all processors, and initiate an interrupt request to processors; a configuration register, storing various configuration information required by processing modules.

21 Claims, 10 Drawing Sheets

(56) References Cited

U.S. PATENT DOCUMENTS

| | | | |
|---|---|---|---|
| 6,760,833 B1 * | 7/2004 | Dowling | G06F 9/3842 711/105 |
| 7,669,086 B2 * | 2/2010 | Gower | G06F 9/52 711/150 |
| 2011/0219208 A1 * | 9/2011 | Asaad | G06F 15/76 712/12 |
| 2013/0305009 A1 * | 11/2013 | Durant | G06F 9/5016 711/170 |

\* cited by examiner

P1
Write (A);
Barrier;

P2
Barrier;
Read (A);

MULTIPROCESSOR SYSTEM AND SYNCHRONOUS ENGINE DEVICE THEREOF

FIELD OF THE PRESENT APPLICATION

The invention relates to the technical field of parallel program data processing, in particular to a multi-processor system and its synchronous engine device.

BACKGROUND OF THE PRESENT APPLICATION

In parallel programs, a plurality of processes/threads (hereinafter referred to process) work concurrently in coordination to finish a processing task. During their operation periods, a plurality of processes is required to use synchronization primitives to achieve the synchronization among a plurality of processes. A synchronization primitive is a key primitive for ensuring the correctness of parallel programs. The primitives containing the meaning of synchronization used frequently in parallel programs are Lock and Barrier. FIG. 1 is a schematic diagram illustrating an exemplary of the realizing a sequence of read/write by using Barrier synchronization primitive in a parallel program. As shown in FIG. 1, the synchronization primitive Barrier ensures that a value read by the process P2 must be the value written by the process P1 when the process P2 reads the value of a variable A. The primitive Lock is used generally in scientific computing to ensure an exclusive access to a certain resource among a plurality of processes. Its realization generally relies on special instructions, such as the typical LL/SC instruction, provided by a processor.

Besides the primitives, such as Barrier and Lock, containing synchronization meaning only, there are also some frequently used implicit synchronization primitives in parallel programs, such as Reduce or All-Reduce. The primitive Reduce can be expressed simply as Reduce (Root, $A_i$, Op, Com), where Root expresses the root process of the present Reduce calculation, $A_i$ expresses a source data associated with Reduce in the process i, Op expresses the calculate mode of Reduce, commonly "accumulation", "descrease", "maximizing", and "minimization" etc., and Com symbols a set of processes participating in this Reduce. Reduce (Root, $A_i$, Op, Com) has the following meaning: data $A_i$ of each process i in the set Com all uses the Op mode for calculation and returns the results of the operation to Root. In this Reduce calculation, it is implicated that all processes in the set Com are synchronous with the process Root, i.e. the process Root may not get the final operation result until all processes in the set Com have reached at a certain time point, and when the synchronization has been realized, a data transfer between processes is then realized too, in the same time. The difference between All-Reduce and Reduce lies only in that for All-Reduce, the final calculation result is broadcasted to all processes in the set Com rather than to the process Root only. Without a special explanation in the following text, both All-Reduce and Reduce are referred to Reduce.

Using software to realize the above-mentioned synchronization primitives in the prior art has a good flexibility but with a low execution efficiency, mainly expressed as, large start cost, slow execution speed and too much inter-process communications. For example, same to the method employed by a counter, the Barrier realized with software may use a shared counter A, and A is initialized to 0 by the process Root, and then each process participating in Barrier executes an operation A=A+1, and reads the value of A continuously in loop. When the value of A is equal to the total number of processes participating in Barrier, it indicates that all processes have reached in synchronization. However, this method of the software realization has two drawbacks, one is that when A=A+1 is executed, counter A may be operated by a plurality of processes simultaneously since A is shared, therefore each process will ensure that its own operation is an atomic operation. Thus either a lock technique or a method of locking memory bus method will be applied to ensure an atomic operation, which is time-consumed and will influence the processor's performance; the other lies in that when each process reads the value of A in loop, since A is allocated in a memory of a certain processor, in the case of multi-processors, if a Cache coherence is ensured among the multiple memories, it will cause an exchange of a large amount of Cache coherence control information among processors, whereas if there is no Cache coherence guarantee, a large amount of remote Load operations will be raised during the loopread of A value, and in any case, it will cause a great occupation of a large amount of communication bandwidth of multiprocessor, influencing thus the system's performance.

A software-based Reduce algorithm is similar to the above-mentioned Barrier. Besides calculating if all processes have reached at a synchronization point, in the software-based Reduce algorithm, the data of each process should also be calculated and the result is put into a variable Value of a shared memory. The data of the process 0 is assumed as Value0, the data of the process 1 is assumed as Value1 . . . , and the data of the process N is assumed as ValueN. The Process Root initializes the Value according to the operation type of Reduce, e.g. when the operation type of Reduce is "maximizing", the Value is then initialized as the minimal value that a computer can expresses, and each process n performs the following operation subsequently:

If (Value n larger than Value)

Value=Value n;

Similarly, each process is required to ensure the atomicity of the above-mentioned operation. When all processes have finished calculations through Barrier-mentioned counter A, the final value of Value is the maximal one of all processes' data, and each process can then read the value of the Value, i.e. the Reduce with the operation type "maximizing" is finished.

Similar to Barrier, using software to realize the operations Reduce and Lock among a plurality of processors has the same problem. Although using some improved algorithms by the software may reduce the above-mentioned shortcomings, the problem cannot be completely solved. The problems such as slower execution speed and the cost of processor's execution resource still exist.

SUMMARY OF THE PRESENT APPLICATION

It is the objective of the invention to provide a multiprocessor system and its synchronous engine device, which may well support various routine synchronous operations under an environment of multiprocessor with high execution speed, small occupation of communication bandwidth of processor, and better usability no matter whether there is Cache coherence among processors. At the same time, since the synchronous engine device is a hardware-based equipment, the atomicity for computing may be easily ensured.

To achieve the objective of the invention, it is to provide a synchronous engine device of multiprocessor, comprising:

A plurality of storage queues, being configured to receive synchronization primitives transmitted by a plurality of processors, wherein one of the queues stores all synchronization primitives from one of the processors;

A plurality of scheduling modules, being configured to select the synchronization primitive(s) to execute from the plurality of storage queues and then transmit the selected synchronization primitive(s) to corresponding processing module(s) for processing according to the type(s) of the selected synchronization primitive(s), the scheduling module (s) correspond in a one-to-one relationship with the storage queues;

A plurality of processing modules, being configured to receive the synchronization primitives transmitted by the scheduling modules to execute different functions;

A virtual synchronous memory structure module, using a small memory space and mapping main memory spaces of all processors into a synchronous memory structure through a control logic to realize the function of all synchronization primitives;

A main memory port, being configured to communicate with the virtual synchronous memory structure module to read and write the main memory of all processors and initiate an interruption to the processors;

A configuration register, being configured to store various configuration information required by the processing modules.

At the time of saving synchronization primitive into corresponding storage queues, the process ID is also stored in order to distinguish primitives coming from different processes in the same processor from each other.

said the processing modules, comprises: Reduce processing module, Barrier processing module, Load/Store processing module, and Put/Get processing module.

Processing modules of the synchronous engine device may be expanded according to the types of synchronization primitive supported by the synchronous engine device.

Synchronous memory structure is virtualized by use of a small amount of on-chip memories, and does not occupy the main memory space of processors.

Synchronous memory structure is {Count, P, L, Value}, {Count, P, L,} is called the Tag of synchronous memory, and the bit width of Count and Value may be set according to different demands of the system. Value: the memory unit is configured to store data, L: Lock flag bit, is configured to support the Lock/Unlock primitive, P: Produce flag bit is configured to realize Put/Get primitive, and Count: a counter is configured to realize Barrier primitive, Reduce primitive, and a plurality of modes of Put/Get primitives. The bit width of the counter is related with the maximum number of the parallel processes supported by the synchronous engine device, and Count with n bits may support $2^n$ processes at maximum.

The method for virtualizing the synchronous memory structure is: using an on-chip memory as a Hash table, each term of the Hash table is of the structure of {Key Value, Tag, Value}. When a processing module writes a synchronous memory structure, said processing module executes an instruction, puts an address of the instruction as a key value to apply the Hash algorithm to select a line in the Hash table as a memory unit, and the synchronous structure carried by the instruction is stored in the memory unit; when the processing module reads a synchronous memory structure, it also uses the Hash algorithm to find the term corresponding to the address, and the Hash table outputs the content of the found line {Tag, Value}; if no corresponding term is found by using the Hash algorithm during the read process, and it means that the execution of the current instruction should be postponed, then the instruction will be returned to a corresponding storage queue, waiting for scheduling again; after the synchronization primitive has been executed, if the execution results of Tag of the synchronous memory structures are all equal to 0, it means that this term of synchronous memory structure has been completely executed, and the corresponding memory space will be released in the Hash table; when Hash table is overflowed, main memory port will be used to issue an interrupt request to corresponding processor, and a Hash table will be constructed in a main memory of processor to store synchronous memory structure, where {Count, P, L,} is called as the Tag of synchronous memory; and Value is a memory unit.

To achieve the objective of the invention, it is also to provide a multiprocessor system using synchronous engine device of multiprocessor, characterized in that system comprises a plurality of processors and a processing chip, wherein:

the processing chip comprises:

A plurality of equipment ports, being configured to interconnect with the plurality of processors with high speed link, and each processor connecting with one of the equipment ports;

the synchronous engine device, wherein, storage queues connect with the plurality of equipment ports;

During the process of device discovery, each processor searches and finds the corresponding equipment port through a standard device searching procedure, and allocates various resources requested by the equipment port; the synchronous engine device maps its own resources into operation system of the processor through equipment port. Software on a plurality of processors operates the synchronous engine device through such mapping relation, as a result, the synchronous engine device is shared by a plurality of processors.

To achieve the objective of the invention, it is also to provide a processing method for Barrier primitive of the synchronous engine device of said multiprocessor, and the method comprises the following steps:

110. initializing the synchronous engine device system: allocating a plurality of continuous addresses to synchronous memory structures as a plurality of Barrier variables, meanwhile maintaining a register named Barrier_HW_State to indicate a done state of a plurality of Barrier variables, each processor allocating a segment of space in its main memory as Barrier_State, which is an indication of the done state for Barrier;

120. N processes calling Barrier primitive, and using the Barrier variable to execute one Barrier operation, meanwhile the $n^{th}$ process saving the state of the $n^{th}$ bit of Barrier_State into its local variable Local_Barrier_State;

130. after receiving a Store instruction to the Barrier variable, the synchronous engine device writing a value into the Barrier variable according to a physical address of Store, wherein the value equals to N−1;

140. Barrier processing module reading the synchronous memory structure of corresponding address, if the synchronous memory structure does not exist, or if the Count in the synchronous memory structure is read as 0, then constructing a synchronous memory structure, wherein Count equals the value of Store, and if the Count in the synchronous memory structure does not equal 0, then executing the next step 150;

150. the Barrier processing module reading the synchronous memory structure from corresponding address, and subtracting 1 from the Count of the read synchronous memory structure;

160. judging if Count is equal to 0, if yes, it indicating that all processes have reached at a synchronization point and one Barrier has been finished, then reversing a corresponding bit of Barrier_HW_State, and broadcasting Barrier_HW_State to the positions of Barrier_State of a plurality of processors; otherwise, returning to the step 150;

170. after transmitting the Store instruction, each process querying periodically the value of the $n^{th}$ bit of Barrier_State subordinate to the present processor. If the queried value is equal to the value of Local_Barrier_State, it meaning that the Barrier of the present process has not been finished, then querying again later; if the queried value does not equal Local_Barrier_State, it meaning that Barrier has been finished, then process quitting the query state and quitting the Barrier primitive calling, too; wherein Count is a counter. The initialization step 110 for the synchronous engine device system includes the following steps:

111. allocating a plurality of continuous addresses to synchronous memory structures as a plurality of Barrier variables, and writing pointed information into configuration register;

112. maintaining a register named Barrier_HW_State to indicate a done state of a plurality of Barrier variables in synchronous engine device, wherein each bit corresponding to a done state of a Barrier variable;

113. each processor allocating a segment of space in its main memory as Barrier_State to indicate the done state for Barrier, wherein each processor's Barrier_State is initialized into 0, and Barrier_State is shared and read by each process inside the corresponding processor;

114. each processor transmitting the physical address of the applied Barrier_State to configuration register.

To achieve the objective of the invention, it is also to provide a processing method for Reduce primitives of the synchronous engine device of multiprocessor, method comprises the following steps:

210. initializing the synchronous engine device system: allocating a plurality of continuous addresses to synchronous memory structures as a plurality of Reduce variables, meanwhile maintaining a register named Reduce_HW_State to indicate a done state of a plurality of Reduce variables. Each processor allocates a segment of space in its main memory as Reduce_State, which is an indication of the done state for Reduce;

220. N processes calling Reduce primitives, and using Reduce variable Rn to execute one Barrier operation, meanwhile the $n^{th}$ process saves the state of the $n^{th}$ bit of Reduce_State into its local variable Local_Reduce_State;

230. each process which participates in Reduce transmitting the data structure of Reduce primitive into the synchronous engine device; after receiving the data structure of the Reduce, synchronous engine device writing a value to Reduce Variable Rn according to the physical address of Reduce, where the value is equal to N−1;

240. the Reduce processing module reading the synchronous memory structure of corresponding address, if the synchronous memory structure does not exist, or if the read Count in the synchronous memory structure equals 0, then constructing a synchronous memory structure, wherein the Count is equal to N−1, and storing the source data in the Reduce data structure into the Value of the synchronous memory structure; if the read Count in the synchronous memory structure does not equal 0, then executing the next step 250;

250. Reduce processing module reading the synchronous memory structure of corresponding address, subtracting 1 from the corresponding Count, and calculating the Value read from the synchronous memory structure with the source data in the Reduce data structure, then storing the result into the Value of the synchronous memory structure;

260. judging if the value of Count is equal to 0, if yes, it meaning that one Reduce has been finished, then reversing a corresponding bit in Reduce_HW_State, after that broadcasting Reduce_HW_State to the positions of Reduce_State of n processors; otherwise, returning to the step 250;

270. after transmitting the Reduce data structure, each process querying periodically the value of the $n^{th}$ bit of Reduce_State subordinate to the present processor, if the queried value is equal to the Local_Reduce_State, it meaning that the Reduce of the present process has not been finished, then querying again later; if the queried value does not equal Local_Reduce_State, it meaning that the Reduce has been finished, quitting the query state; wherein Value is a memory unit; Count is a counter.

The initialization step for the synchronous engine device system includes the following steps:

211. allocating a plurality of continuous addresses to synchronous memory structures {Count, P, L, Value} as a plurality of Reduce variables, and writing pointed information into a configuration register of the synchronous engine device;

212. maintaining a register named Reduce_HW_State to indicate a done state of a plurality of Reduce variables in synchronous engine device, where each bit corresponding to a done state of a Reduce variable;

213. each processor allocating a segment of space in its main memory as Reduce_State to indicate the done state for Reduce, where each processor's Reduce_State is initialized into 0;

214. each processor transmitting the physical address of the applied Reduce_State to the configuration register of the synchronous engine device.

The data structure of the Reduce primitive is {Reduce Variable Address, Operator, Data Type, Process Number-1, Source Data}.

To achieve the objective of the invention, it is also to provide a processing method for the Lock primitive of the synchronous engine device of the multiprocessor, the processing method including the following steps:

310. each processor applying for a variable Lock_Result in its main memory, resetting the variable, and putting the physical address of the variable as a return physical address of the Lock primitive data structure;

320. synchronous engine device, after having received the data structure of the Lock primitive transmitted by the process, reading the synchronous memory structure according to the objective physical address of the data structure, if it reads no synchronous memory structure, or the L bit in the read synchronous structure is equal to 0, it meaning that the physical address has not been locked, then executing the Lock primitive, and turning to the next step 330; if the L bit of the read synchronous memory structure is equal to 1, it meaning that the physical address has been locked, then abandoning the execution of the present Lock, and putting the Lock primitive into corresponding storage queue to wait for being scheduled again;

330. setting the L bit of the synchronous memory structure as 1 and storing it, and writing 1 into Lock_Result of the main memory according to return physical address;

340. the process querying Lock_Result periodically, if the read Lock_Result is equal to 0, it meaning an unsuccessful lock, then querying once again after a delay; if the read Lock-Result is equal to 1, it meaning a successful lock, then quitting the Lock calling; wherein L is a flag bit of Lock.

The Lock primitive data structure is {Return Physical Address, Objective Physical Address}, the return physical address indicates that when it is successfully locked, the synchronous engine device will store the information of success into the return physical address of the main memory; the objective physical address expresses what physical address the software will lock.

To achieve the objective of the invention, it is also to provide a processing method for the Unlock primitive of the synchronous engine of the multiprocessor, the method including the following steps:

A process transmitting the data structure to the synchronous engine device and quitting Unlock calling;

After receiving the Unlock data structure, the synchronous engine device, reading a synchronous data structure from a Hash table according to an objective address, and resetting the L bit, if the synchronous data structure all are 0 after the resetting of the L bit, then releasing this term of synchronous data structure, otherwise only writing back the data structure with the reset L bit; where L is a flag bit of Lock.

The data structure of the Unlock primitive is {Objective Address}, and only one element in the data structure expresses the variable's address needed for unlock.

To achieve the objective of the invention, it is also to provide a processing method for the Put primitive of the synchronous engine of the multiprocessor, the method including the following steps:

410. a process transmitting the data structure of the Put primitive to the synchronous engine device and quitting the Put calling;

420. the Put processing module of the synchronous engine device reading a synchronous data structure according to an objective address of the Put primitive data structure, if it does not exist, then constructing a new synchronous memory structure, if it exists, reading the existed synchronous memory structure;

430. setting 1 to the P bit of a synchronous memory structure which is read according to the objective address of the data structure of the Put primitive, and storing the source data of the received Put primitive into the Value bit of the synchronous memory structure; where P is a flag bit of Produce; Value is a memory unit.

The Put primitive data structure is {Objective Address, Source Data}, where the objective address expresses the physical address where the source data of the Put primitive is to be stored; the source data expresses the data content moving in the Put primitive.

To achieve the objective of the invention, it is also to provide a processing method for the Get primitive of the synchronous engine device of the multiprocessor, the method including the following steps:

510. the processor allocating a segment Get_Result in its main memory space for storing the data structure of the Get return value, and resetting the applied space;

520. according to the received objective address in the Get primitive data structure transmitted by the process, the Get processing module reading a corresponding synchronous memory structure, if there is no corresponding synchronous memory structure, then abandoning the execution of Get, and putting the Get primitive back into the storage queue to wait for being scheduled once again; if there is a corresponding synchronous memory structure and its P bit is 0, then abandoning the execution of Get, and putting the Get primitive back into the storage queue to wait for being scheduled once again; if a corresponding synchronous memory structure exists in the Hash table, and its P bit is 1, then executing the next step 530;

530. resetting the P bit in the read synchronous memory structure, reading the Value content of the synchronous memory structure, and writing the return value {1, Value} into the main memory of the processor according to the return physical address in the Get primitive data structure;

540. if the Tag of the synchronous memory structure is zero after the resetting, releasing the corresponding memory structure term, otherwise writing back the synchronous memory structure with the P bit reset;

550. querying periodically the done flag of data structure in Get_Result, if the queried result is 0, it meaning that the Get primitive has not been executed, then continuing to query after a delay time; if the queried result is 1, it meaning that the Get primitive has been executed, then executing the next step 560;

560. reading the return data of the data structure in Get_Result, and quitting the Get calling; where P is a flag bit of Produce; Value is a memory unit; {Count, P, L,} is regarded as the Tag of the synchronous memory.

The Get primitive data structure is {Return Physical Address, Objective Physical Address}. The various elements in the data structure have the following meanings: the return physical address is an address for storing the data which returns to Get and the done flag, after Get has been executed successfully, and the data structure of the Get return value is {Return Data, Done Fag}, where the return value is stored in the return physical address continuously; the objective address expresses the physical address of the data which Get intends to acquire.

The beneficial effect of the invention is: the synchronous engine device according to the invention uses a unified shared memory structure to support and speed up the basic primitives such Barrier, Lock/Unlock, Reduce, Put/Get etc., and raises greatly the execution speed of synchronization primitives, decreases the communication among processes, simplifies the interface of the synchronization primitives, relies not on the Cache coherence of multiprocessor and special instruction sets of processor, so that it makes the parallel program use synchronization primitives more easily, having the features of easy use, broader application and fast execution speed.

BEST EMBODIMENTS FOR REALIZING THE PRESENT INVENTION

To make the objective, the technical scheme and the advantages of the invention more clear, a multiprocessor system and its synchronous engine according to the invention will be described in details in the belowing in accompaniment with attached drawings and embodiments. It is understood though that the described concrete embodiments are used only for describing the invention and not for limiting the invention.

A multiprocessor system and its synchronous engine disclosing in the invention changes the mode of using software to realize synchronization primitives, uses a unified shared memory structure, and supports and speeds up the basic synchronization primitives such as Barrier, Lock/Unlock, Reduce, Put/Get etc. through hardware. The multiprocessor system and its synchronous engine do not rely on the Cache coherence of multiprocessor and special instruction sets of processor, and have the features of easy use, broader applications and rapid execution speed.

Figures 1, 2:
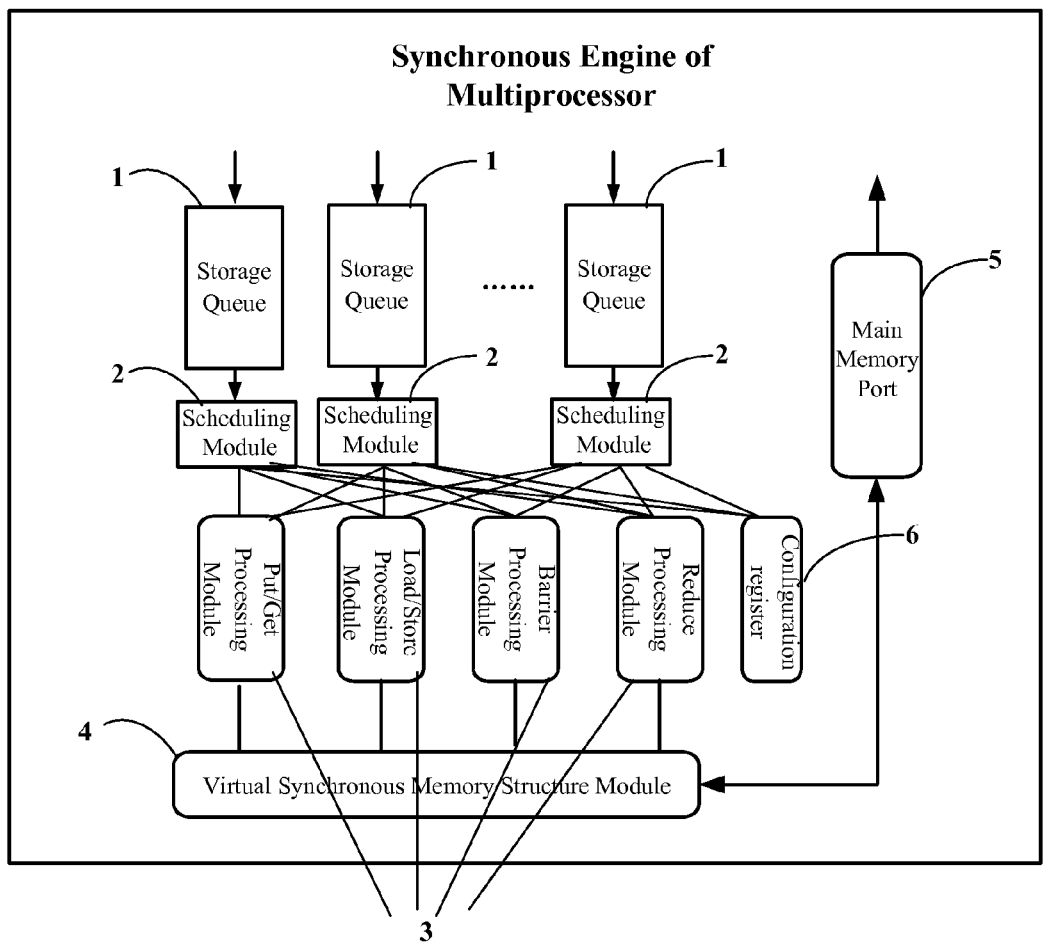
FIG. 1 is a diagram of an exemplary of the execution of read/write sequence by using Barrier synchronization primitives in parallel program.
FIG. 2 is a diagram of the structure of the synchronous engine device of the multiprocessor according to the invention.

A synchronous engine of multiprocessor according to the invention is described in details in accompaniment with the above-mentioned objective as following. FIG. 2 is a diagram of the structure of the synchronous engine device of the multiprocessor according to the invention. As shown in FIG. 2, the synchronous engine includes:

A plurality of storage queues 1, is configured to receive synchronization primitives transmitted by a plurality of processors, wherein one queue stores all synchronization primitives from one processor;

The synchronization primitives transmitted by processors 1 to n to the synchronous engine are stored in the queues 1 to n, respectively.

Since one queue stores all synchronization primitives from one processor, and a plurality of processes may be operated on one processor, therefore when the synchronization primitive is stored into a corresponding queue, a process ID should be stored simultaneously to distinguish the synchronization primitives transmitted from different processes on the same processor. On the exit of the queue, scheduling module is used to schedule the synchronization primitives from different processes in the same queue to ensure that the synchronization primitives from different processes will not be blocked with each other.

A plurality of scheduling modules 2, is configured to select the synchronization primitives for execution from the plurality of storage queues and then transmit them to the corresponding processing modules for processing according to the type of the synchronization primitive, wherein the scheduling module corresponding in a one-to-one relationship with the storage queue;

A plurality of processing modules 3 is configured to receive the synchronization primitives transmitted by the scheduling modules to execute different functions;

The processing modules are Reduce processing module, Barrier processing module, Lock/Store processing module, and Put/Get processing module, as shown in FIG. 2. If the synchronous engine supports more types of synchronization primitives than those mentioned above, it may expand more processing modules here.

Figure 3:
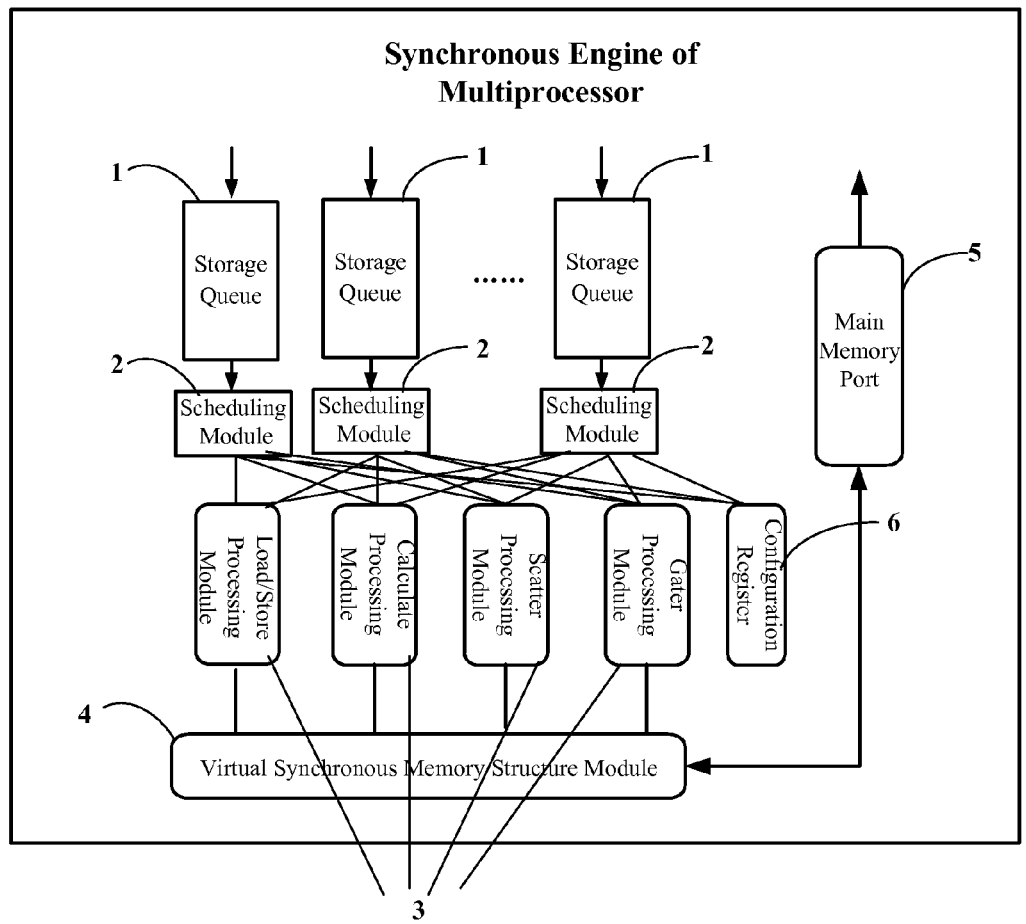
FIG. 3 is a diagram of the structure of the synchronous engine device of the multiprocessor according to another embodiment of the invention.

In another embodiment, the processing module may also be stored in a form shown in FIG. 3. The processing module includes Scatter processing module, Calculate processing module, Load/Store processing module, and Gather processing module, wherein the Gather module is used to realize a many-to-one gathered communication mode to gather the information from a plurality of source ports and transmit the information to special objective ports. The module is used in the process of gathering source data of Barrier and Reduce operations. The Scatter processing module is used to realize a one-to-many gathered communication mode to distribute the data from one source port to a plurality of objective ports. The module is used in the process of distributing the result of Barrier and Reduce operations. The Calculate processing module is used to realize a calculation function. The module is used for calculating the data submitted by the Gather processing module to realize the calculating functions required by Lock and Put/Get. The Load/Store processing module is used to realize an access to the synchronous memory structure in the mode of Load/Store. The Barrier operation may be executed with the coordination of the Gather processing module and the Scatter processing module. The Reduce operation may be done through the Gather processing module, the Scatter processing module and the Calculate processing module. The Put/Get operation may be done through the Calculate processing module and the Load/Store processing modules.

A virtual synchronous memory structure module 4 is realized by using RAM, which is used as a memory, and control logic. Its objective is to use small memory space and maps main memory spaces of all processors into a synchronization memory structure {Count, P, L, Value} via control logic. It may realize the functions of all synchronization primitives by using such synchronous memory structure. The method of mapping realized by the control logic will be described in the following.

A main memory port 5, is configured to read/write the main memory of all processors and initiate an interrupt request to a processor;

A configuration register 6, is configured to store various configuration information transmitted by various software. The configuration information includes interrupt number used to issue interrupt request, a physical address for the synchronous engine to write necessary data to the main memory, for instance. The configuration registers use register(s) for storage, and configuration information required by every function module is read from them.

In the processing module shown in FIG. 2, all data being used are synchronous memory structures {Count, P, L, Value} provided by the virtual synchronous memory structure module, this memory structure is virtualized by the synchronous engine by using a small amount of on-chip memories, and it does not occupy the space of processor's main memory.

A storage queue 1 stores all synchronization primitives from one processor. When the synchronization primitives are stored into a corresponding storage queue 1, the process IDs are stored simultaneously to distinguish the synchronization primitives transmitted from different processes on the same processor. At the reading port of the storage queue 1, a scheduling module 2 is used to schedule the synchronization primitives from different processes on the same storage queue according to the types of synchronization primitive to ensure that the synchronization primitives from different processes will not block with each other. A plurality of processing modules 3, according to the schedule of the scheduling module 2, use the data provided by the virtual synchronous memory structure module 4 to execute the corresponding synchronization primitives, in this case, synchronization primitives in parallel programs are implemented and accelerated in hardware.

For a common address space, a memory structure is only a structure for storing data, for example for the address A of a 32-bit address 32'h0000_8600, the meaning of Store (A, 3556) is only that an immediate number 3556 is written into the address A, then the value 3556 is stored in the space of the address A. When the Store instruction has been executed, if using the instruction Load (A) to read the content of the address A, then the return value should be 3556. A typical main memory of processor is a memory in the common sense. It may not ensure the execution sequence of the Store and Load instructions for the memory structure, and needs an additional method to ensure that the Load instruction will be executed after the Store instruction to ensure the read data will be 3556. A practicable method to ensure the read/write sequence is provided in FIG. 1.

Figure 4:
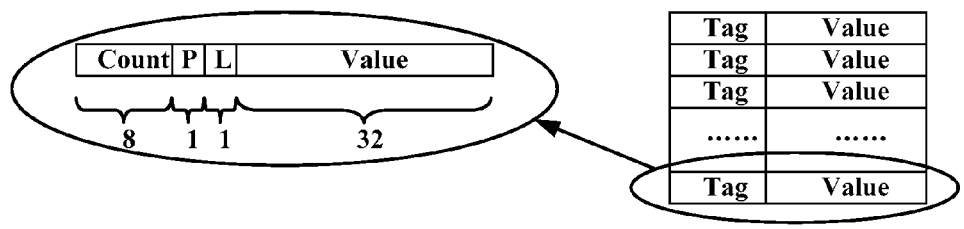
FIG. 4 is a diagram of the synchronous memory structure according to the invention.

According to the invention, the synchronous engine maps the memory structure of address space into a new memory structure (synchronous memory structure). FIG. 4 is a diagram of the synchronous memory structure according to the invention. As shown in FIG. 4, by using the synchronous memory structure, it may not only support and speed up the basic synchronization primitives such as Barrier, Lock/Unlock, Reduce, etc., but also support a new synchronization primitive which may maintain automatically the read/write sequence shown in FIG. 1 without using Barrier. This synchronization primitive which may maintain automatically the read/write sequence is called Put/Get primitive. The Put primitive represents a writing operation, and the Get primitive represents a reading operation. The synchronous engine disclosed in the invention may maintain the execution sequence of Put and Get primitives, and ensure that the content read by a Get operation is definitely the content written by a Put operation.

Synchronous memory structure is formed by adding a head to the front of a common single memory space Value to construct a synchronous memory structure like {Count, P, L, Value}. In the synchronous memory structure, {Count, P, L,} is regarded as the Tag of the synchronous memory. The bit width of Count and Value in the synchronous memory structure may be set differently according to system's requirements, and the bit width shown in FIG. 4 is only an example. In FIG. 4, there are a L bit, a P bit and 8-bit Count in front of each 32-bit memory space. Elements in a synchronous memory structure have the following meaning:

Value: a memory unit for storing data. A general-purpose processor may use a common Store instruction to write contents into it, and may also use a common Load instruction to read the stored contents from it.

L: Lock flag bit. After Lock instruction has been successfully executed, the synchronous engine assigns this flag bit to 1 automatically. L's content of 1 indicates that the memory unit is locked, and any other locking primitive to the memory unit may not be successfully executed. After an Unlock instruction has been successfully executed, the synchronous engine assigns this flag bit to 0 automatically. L's content of 0 indicates that the memory unit is unlocked, and the first locking primitive thereafter may be successfully executed. Using this flag bit may support the Lock/Unlock primitives.

P: Produce flag bit. After the Put instruction has been successfully executed, when a condition is met, the synchronous engine assigns this flag bit to 1. P's content of 1 indicates that the data of the memory unit is allowed to be acquired by the Get instruction, and after the Get instruction has been successfully executed, the synchronous engine will assigns automatically this flag bit to 0 when the condition is met. Using this flag bit may realize the Put/Get instruction and ensure the read/write sequence.

Count: a counter. It may be used to realize Barrier, Reduce and various modes of Put/Get primitives. The bit width of the counter is relevant to the maximal number of parallel processes supported by the synchronous engine, where an n-bit Count may support $2^n$ processes at maximum.

The value element of the synchronous memory structure is a standard memory unit of the current computers, occupying a real main memory space. The Tag of the synchronous memory structure is generated through the mapping function of synchronous engines, and exists only in the synchronous engines without occupying the memory space of processor. The Tag of synchronous memory structure may not be accessed by the Load/Store instruction of processor, and it should be accessed indirectly through various primitives supported by synchronous engine. The address of synchronous memory structure equals the address of Value before the Tag mapping.

Figure 5:
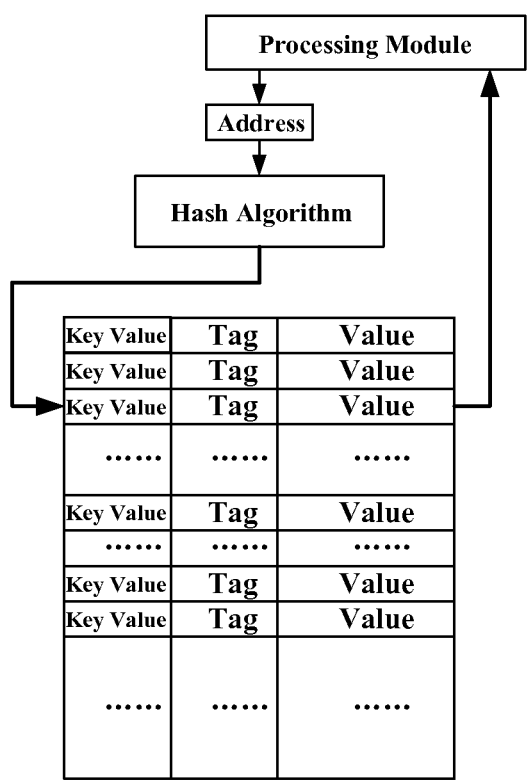
FIG. 5 is a diagram of the structure of the communication between a processing module and a synchronous memory structure according to the invention.

FIG. 5 is a diagram of the structure of communication among the processing modules with the synchronous memory structure according to the invention. As shown in FIG. 5, the method for synchronous engine to virtualize the synchronous memory structure by use of a small amount of on-chip memories is described as following: using an on-chip memory as a Hash table, wherein each term of the Hash table has a structure as {Key Value, Tag, Value}, for example; when a processing module writes in a synchronous memory structure, such as executing Put instruction by Put/Get module, taking the address of the Put instruction as Key Value, using the Hash algorithm with it to select a line from the Hash table as a memory unit, and storing the synchronous structure in the unit; when the processing module reads a synchronous memory structure, using the Hash algorithm similarly to find the term corresponding to the address, and outputting the content of the found line {Tag, Value} from the Hash table. If no corresponding term has been found by using the Hash algorithm during the read process, for instance the Get instruction has been transmitted to the synchronous engine prior to a corresponding Put instruction, it indicates that the current instruction should be postponed to execute, and then the instruction will be returned to the storage queue shown in FIG. 2 to wait for a next scheduling. After the synchronization primitive has been executed, the Tag of the synchronous memory structure will change according to different instructions, and if the results of the execution of the Tag of the synchronous memory structure all are 0, it means that its term of synchronous memory structure has been completely executed, and a corresponding memory space will be released form the Hash table. Therefore, it is possible to use a small on-chip memory space to virtualize the synchronous memory structure without changing the main memory structure of each processor.

In general, the data stored in a Hash table will be used in a very short time, and the synchronous engine may release the occupied space in the Hash table, therefore the probability of the overflow for a Hash table is very small, and the on-chip memory space required for constructing a Hash table is not very large, too. It is possible to refer to the cache of a processor as a relatively similar example and the space of a Cache is far smaller than that of a memory.

When a Hash table overflows, a main memory port shown in FIG. 2 initiates an interrupt request to the corresponding processor, and interrupt handler program simulates the process of the synchronous engine and constructs a Hash table in main memory of the processor to deal with the process. Through this process of constructing the synchronous memory, it is possible to add a Tag for realizing synchronous functions in front of each Value without direct occupation of a main memory of any processor, thus supporting the primitives such as Barrier, Lock/Unlock, Reduce and Put/Get.

The execution steps of the synchronous memory structures for supporting and accelerating the basic synchronization primitives, such as Barrier, Lock/Unlock, Reduce and Put/Get, according to the invention will now be described in details.

Figure 6:
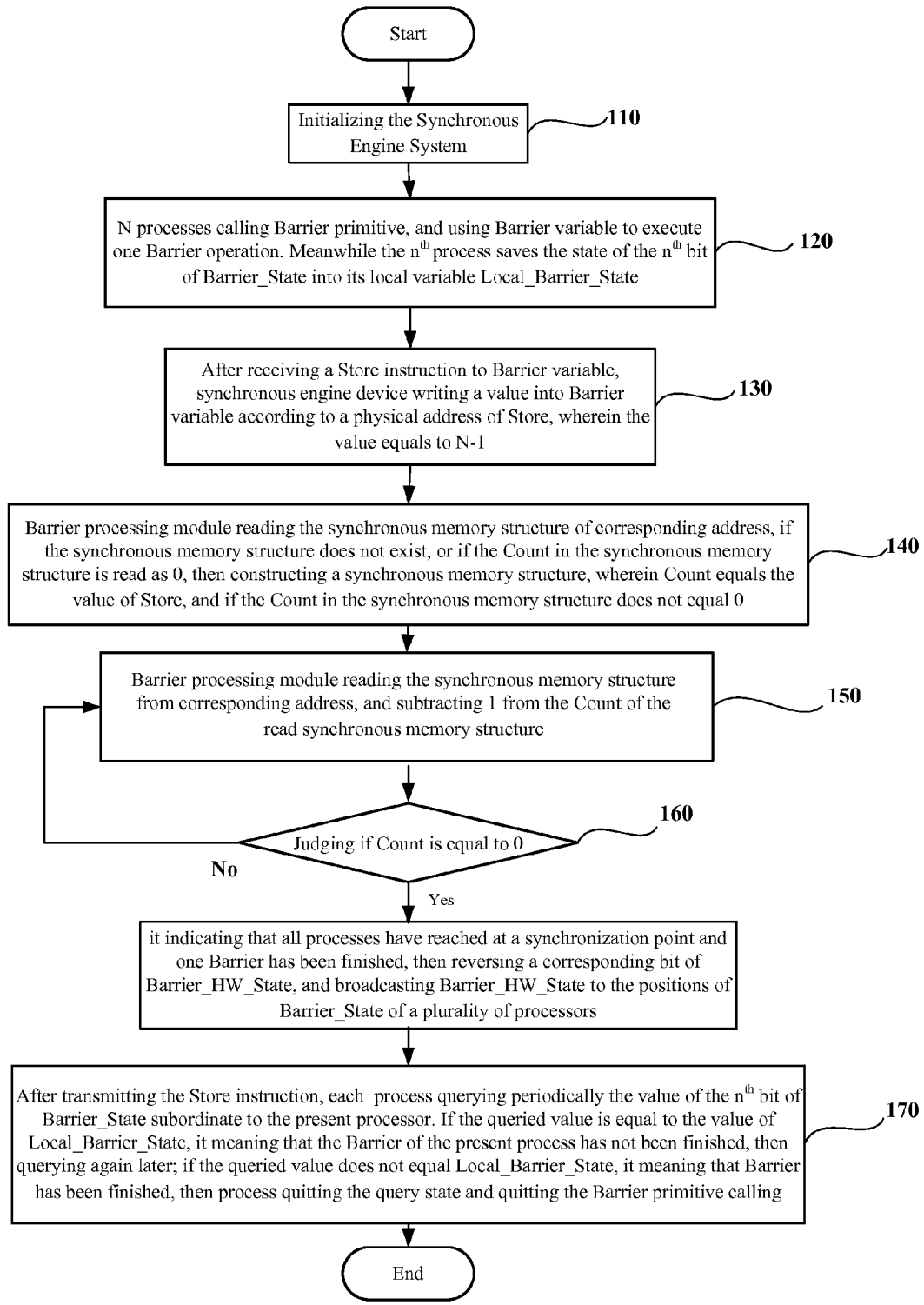
FIG. 6 is a flowchart of steps of supporting the Barrier primitives by synchronous memory structures of the synchronous engine according to the invention.
Figure 7:
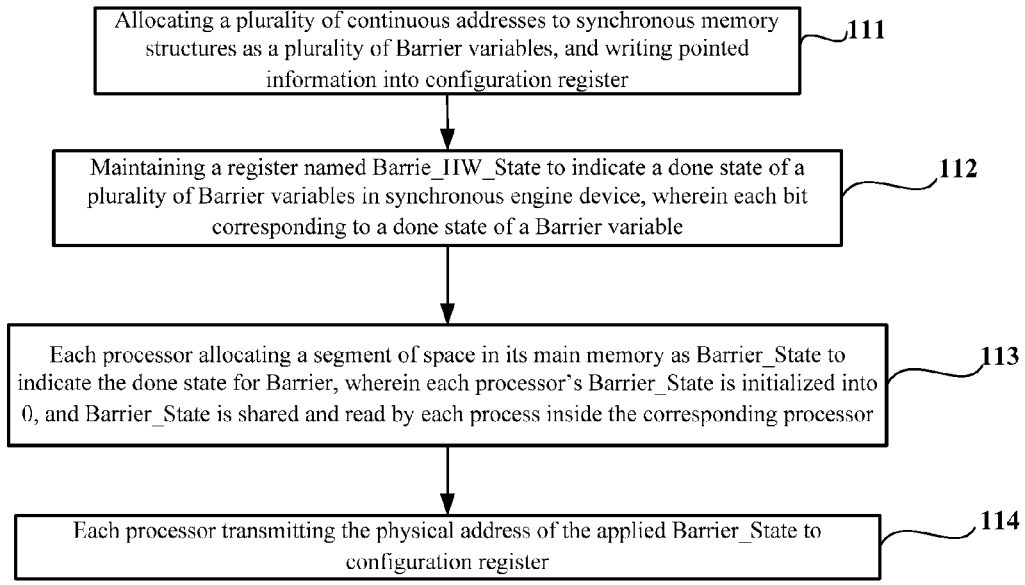
FIG. 7 is a flowchart of steps of the synchronous engine system initialization during the support of the Barrier primitive according to the invention.

1. Taking m processes (m≥1) executing Barrier operation as an example, FIG. 6 is a flowchart of steps for the synchronous memory structure to support Barrier primitive in the synchronous engine according to the invention; FIG. 7 is a flowchart of steps of initialization of the synchronous memory engine system during the supporting of Barrier primitive according to the invention; as shown in FIGS. 6 and 7, including the following steps:

110. Initializing the synchronous engine system (this step is only required to execute for once when the system is powered on);

111. Software constructing the synchronous memory structures {Count, P, L, Value} with a plurality of continuous addresses as a plurality of Barrier variables, where each variable occupies a space of 4 Bytes, and the software writes the allocated address into a configuration register;

112. Maintaining a register Barrier_HW_State which indicates done states of a plurality of Barrier variables in synchronous engine, where each bit corresponding to a done state of a Barrier variable;

113. Each processor allocating a segment of space called Barrier_State in its main memory as the indication for the done states of Barrier, where the size of Barrier_State is equal to the number of Barrier variables divided by 8, with the unit of Byte, the done state of each Barrier variable corresponds to 1 bit in Barrier_State, each processor's Barrier_State is initialized into 0, Barrier_State is shared in each process of the corresponding processor and each process may read it.

If there are 32 Barrier variables, then each processor will apply for 4-Byte Barrier_State in the main memory of the processor. The done state of Barrier variable B0 corresponds to the bit0 of Barrier_State, and the done state of Barrier variable B1 corresponds to the bit1 of Barrier_State.

114. Each processor transmitting the physical address of the applied Barrier_State to the configuration register of the synchronous engine, where the applied Barrier_State address by the processor 1 is Barrier_Mask1, the applied Barrier_State address by the processor 2 is Barrier_Mask2 . . . , and the applied Barrier_State address by the processor n is Barrier_Maskn.

120. A plurality of processes calling Barrier primitives, and using a Barrier variable Bn to execute a Barrier operation, where each process stores a state of the $n^{th}$ bit of Barrier_State of the processor into a local variable Local_Barrier_State of this process;

130. Each process which participates in Barrier using a common Store instruction to write a value into the Barrier variable, where the value is equal to the number of processes participating in Barrier of the whole multiprocessor system minus 1 and this value will be used by the synchronous engine for calculating if all processes have reached at a synchronization point;

For example, m processes (m≥1) use the Barrier variable to execute a Barrier operation. Then the address of Store is equal to the address of the synchronous memory structure represented by the Barrier variable, and the value of Store is equal to m−1. No matter what the execution sequence of a plurality of processes is, the value of Store is fixedly equal to m−1, and for each process the value of Store is the same.

140. After the synchronous engine has received the Store instructions to Barrier variable, since the software has already written the allocated address into the configuration register in the step 111, interpreting all these Store instructions as Barrier primitives according to the physical addresses of the Stores and Barrier processing module reading the synchronous memory structure of corresponding address, if the synchronous memory structure does not exist in a Hash table shown in FIG. 4, or if the read Count in the synchronous memory structure is equal to 0, it meaning that this is the first time to reach the Barrier primitive of synchronous engine, and then constructing a synchronous memory structure in the Hash table, wherein the Count is of the value of Store, i.e. m−1, if the read Count in the synchronous memory structure does not equal 0, then executing the next step 150;

150. Barrier processing module reading the synchronous memory structure of corresponding address, and subtracting 1 from the Count of the read synchronous memory structure;

160. If the Count is equal to 0 after the execution of Barrier in the step 140, it meaning that all processes have already reached at a synchronization point and one Barrier has been finished, then reversing a corresponding bit of Barrier_HW_State, broadcasting Barrier_HW_State to the positions of Barrier_State of a plurality of processors, and keeping the synchronization memory structure in the Hash table; otherwise, returning to the step 150;

170. After transmitting the Store instruction, each process querying periodically the value of the $n^{th}$ bit of Barrier_State subordinate to the present processor, if the queried value is equal to the Local_Barrier_State of the step 120, it meaning that the Barrier of the present process has not been finished and needs to execute another query later; if the queried value does not equal Local_Barrier_State, it meaning that Barrier has been finished, then process quitting the query state and quitting the Barrier primitive calling. For example, if the queried value of the $n^{th}$ bit of Barrier_State subordinate to the present processor is equal to 0, and the Local_Barrier_State saved by the present process is equal to 0, then it means that Barrier has not been finished, while if the Local_Barrier_State is equal to 1, then it means that Barrier has been done. Since only 1 bit is used to represent the done states, therefore their values are either 0 or 1. In the above steps, except that the step 110 of the initialization of system is only required for once, while in other time, the steps are executed from the step 120 and ends at the step 160 when each process calling Barrier primitives. The primitive of Barrier is equivalent of the Store (Barrier variable address, m−1).

Figure 9:
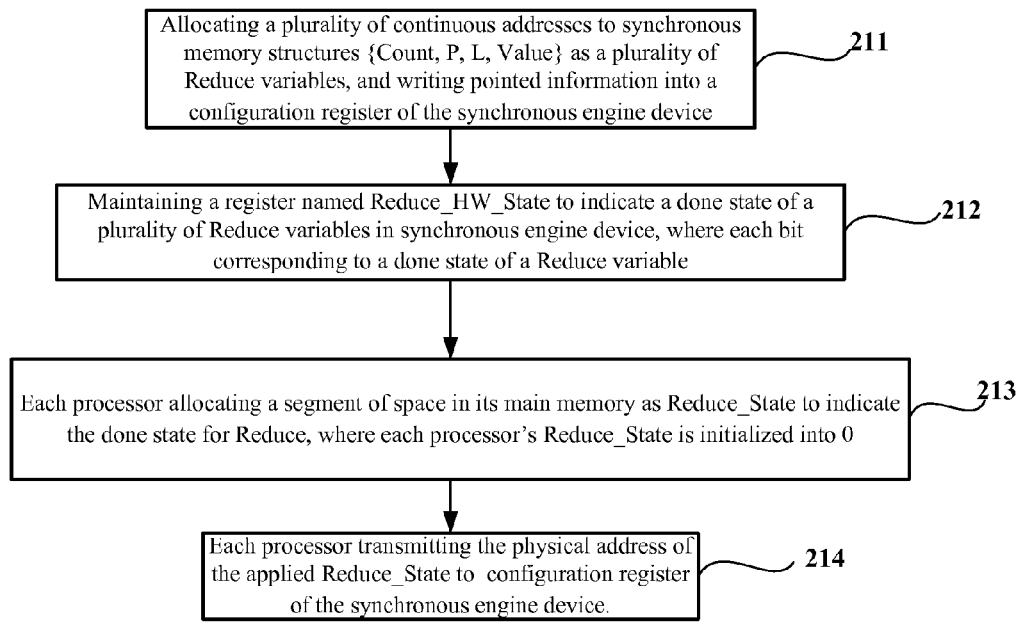
FIG. 9 is a flowchart of steps of the synchronous engine system initialization in the support of Reduce primitives according to the invention.
Figure 8:
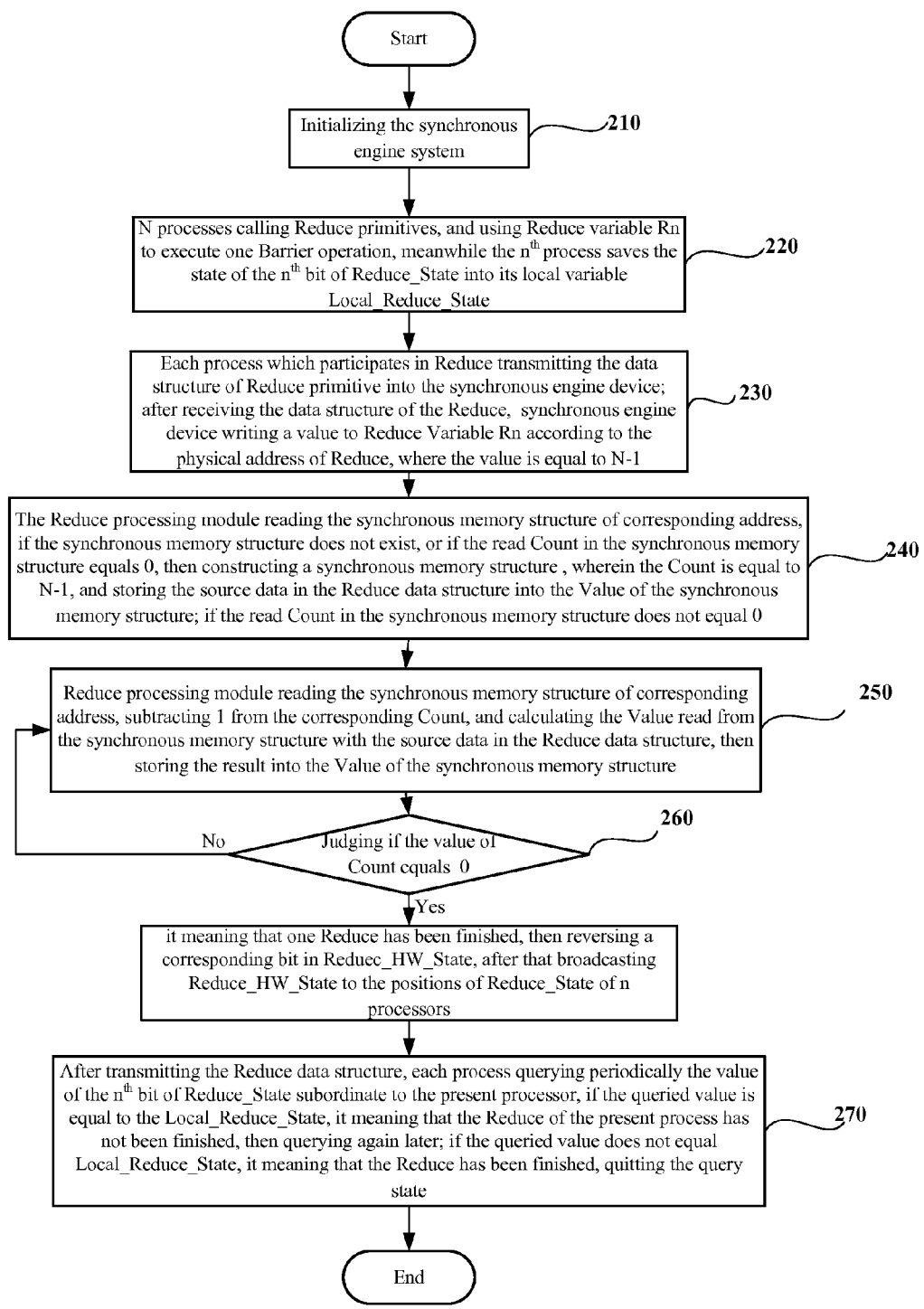
FIG. 8 is a flowchart of steps of supporting the Reduce primitives by synchronous memory structure in the synchronous engine according to the invention.

2. Taking m (m≥1) processes executing Reduce operation as an example, the support and realization to Reduce by the synchronous memory structure in the synchronous engine according to the invention is similar to the Barrier process. The data structure of Reduce primitive supported by the synchronous memory structure is {Reduce variable address, Operator, Data type, Process number−1, Source data}. Each element in data structure has the following meaning: the Reduce variable address represents the selected physical address for a Reduce operation; the operator represents the operation type of this Reduce, such as "addition", "subtraction", etc., the data type represents the type of the source data participating in the operation, such as the "double-precision floating point", the "64-bit fixed point", etc., the number of processes represents how many processes have took part in this Reduce operation, and the source data represents the data taking part in Reduce. FIG. 8 is a flowchart of steps of supporting Reduce primitives by the synchronous memory structure in synchronous engine according to the invention. FIG. 9 is the flowchart of the step of the initialization of the synchronous engine system in the support of Reduce primitives according to the invention, as shown in FIGS. 7 and 8, the method includes the following steps:

210. Initialization of synchronous engine device system (this step needs only to be executed for once when the system is powered on).

211. The software constructs the synchronous memory structures {Count, P, L, Value} with a plurality of continuous addresses as a plurality of Reduce variables, where each variable occupies a space of 8 Bytes, and writing a pointed information into a configuration register of the synchronous engine.

212. Maintaining a register Reduce_HW_State which indicates the done states of a plurality of Reduce variables in the synchronous engine, where each bit corresponding to a done state of a Reduce variable;

213. Each processor allocating a segment of space Reduce_State in its main memory as an indication for the done state of Reduce, where the size of Reduce_State is equal to the number of variables divided by 8 with the unit of Byte, the done state of each Reduce variable corresponds to 1 bit of Reduce_State, and each processor's Reduce_State is initialized into 0;

Assume that there are 32 Reduce variables, and then each processor applies for a 4-byte Reduce_State in its main memory. The done state of the Reduce variable R0 corresponds to a bit0 in Reduce_State, the done state of Reduce variable R1 corresponds to a bit1 in Reduce_State.

214. Each processor transmitting the physical address of the applied Reduce_State to the configuration register of the synchronous engine, where the Reduce_State address applied by the processor 1 is Reduce_Mask1, the Reduce_State address applied by the processor 2 is Reduce_Mask2 . . . , the Reduce_State address applied by the processor n is Reduce_Maskn.

220. A certain process calling Reduce primitives, and using a Reduce variable Rn to execute Reduce operation for once, and each process storing the state of the $n^{th}$ bit of Reduce_State of the processor into a local variable Local_Reduce_State;

230. Transmitting the data structure of the Reduce primitive into the synchronous engine device by each process participating in Reduce, and after the synchronous engine receiving the Reduce data structure, it writing a value to the Reduce Variable Rn according to the physical address of Reduce, where the value is equal to N−1;

240. After the synchronous engine has received the Reduce data structure, the Reduce processing module reading the synchronous memory structure with corresponding address, and if the synchronous memory structure does not exist in the Hash table shown in FIG. 4, or if the read Count in the synchronous memory structure is equal to 0, it meaning that this is the first time to reach a Reduce primitive of the synchronous engine, then constructing a synchronous memory structure in the Hash table, in which the Count equals m−1, and storing the source data of the Reduce data structure into the Value of the synchronous memory structure; if the read Count in the synchronous memory structure does not equal 0, then executing the next step 250;

250. Subtracting 1 from the corresponding Count, and operating the source data in the Value data structure and Reduce data structure read from the synchronous memory structure, and storing the results into the Value in the synchronous memory structure.

260. If the Count is equal to 0 after the execution of Reduce primitives, it meaning that one Reduce has been finished, then reversing the corresponding bit in Reduce_HW_State, after that broadcasting Reduce_HW_State to the positions of Reduce_State of n processors and not releasing the synchronous memory structure in the Hash table; otherwise, returning to step 250;

270. After transmitting the Reduce data structure, each process querying periodically the value of the $n^{th}$ bit of Reduce_State subordinate to the present processor, if the queried state is equal to the Local_Reduce_Staten in the step 220, it meaning that the Reduce of the present process has not been done, then querying again later; if the queried value does not equal to Local_Reduce_Staten, it meaning that the Reduce has been finished, then the software quitting the query state, for example the queried value of the $n^{th}$ bit of Reduce_Staten subordinate to the processor is 0 while the Local_Reduce_Staten saved by the present processor is 0, it means that the Reduce has not been done; if the queried Local_Reduce_Staten is equal to 1, it means that the Reduce has been done. Since only 1 bit is used to represents the done states, their values have only two states of either 0 or 1. When it is found that the Reduce has been done, then use a common Load instruction to read the value of corresponding Reduce variable.

In the above steps, except that the step 210 of the initialization of system is required for only once, while in the other time, the steps are executed always beginning from the step 220 and ending at the step 260 when each process calling Reduce primitive.

Figure 10:
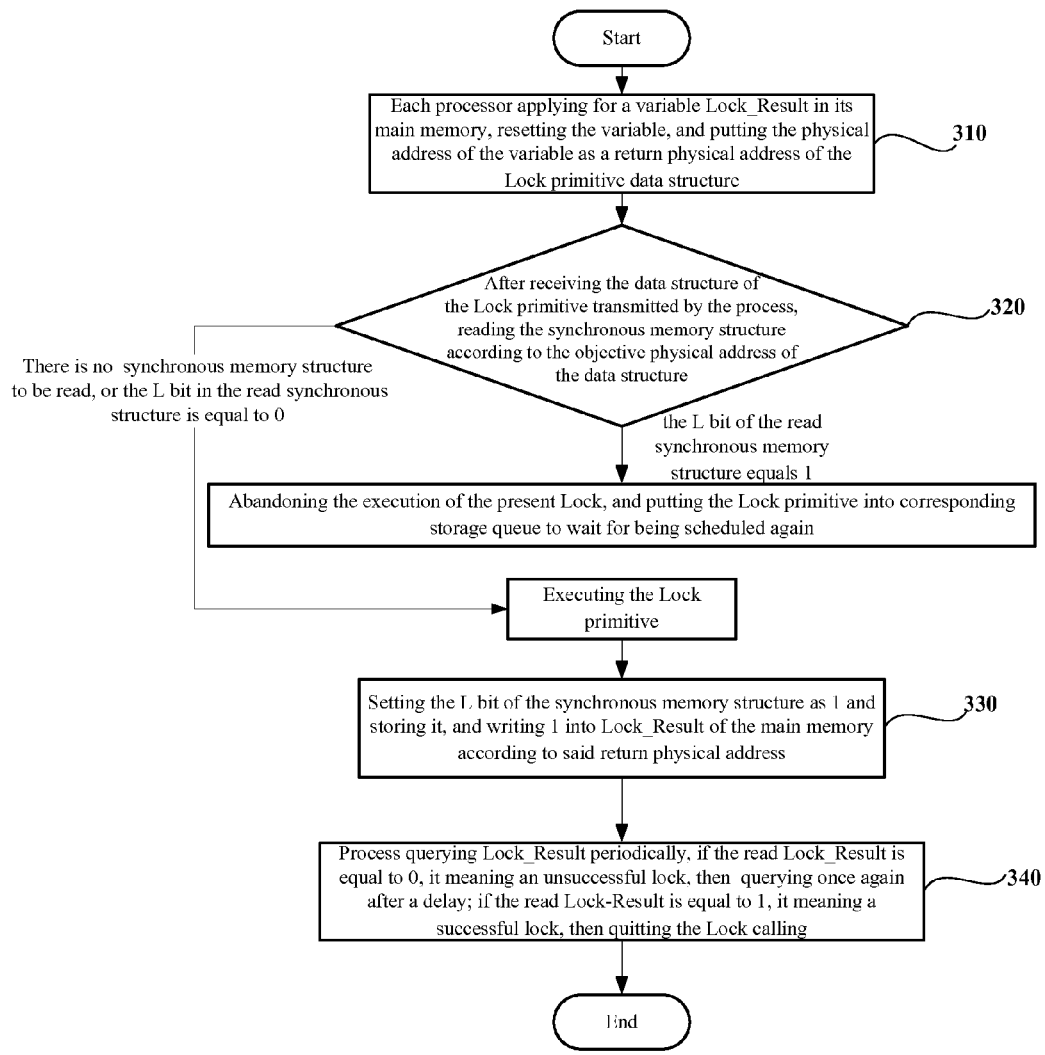
FIG. 10 is a flowchart of steps of supporting the Lock primitives by synchronous memory structure in synchronous engine according to the invention.

3. Taking m (m≥1) processes executing Lock operation as an example, the Lock primitive data structure supported by the synchronous memory structure in the synchronous engine according to the invention is {Return Physical Address, Objective Physical Address}, wherein each element has the following meaning: the return physical address represents that the synchronous engine will put the success information into the return physical address of the main memory when locking is successful; the objective physical address represents which physical address the software will lock. FIG. 10 is a flowchart of steps of supporting Lock primitives by the synchronous memory structure in synchronous engine according to the invention, as shown in FIG. 10, the method including the following steps:

310. Each processor applying for a variable Lock_Result in its subordinate memory, resetting the variable, and putting the physical address of the variable as the return physical address of the Lock primitive data structure;

The process transmits the data structure of Lock primitive to the synchronous engine:

320. The synchronous engine device, after having received the data structure of the Lock primitive, reading the synchronous memory structure according to the objective physical address of the data structure, if there is no synchronous memory structure for reading in the Hash table shown in FIG. 5, or the L bit in the read synchronous structure is equal to 0, it meaning that the physical address has not been locked, then executing the Lock primitive, and turning to the next step 330; if the L bit of the read synchronous memory structure is equal to 1, it meaning that the physical address has already been locked, then abandoning the execution of the present Lock, and putting the Lock primitive into a corresponding storage queue to wait for scheduling again;

330. Setting the L bit of the synchronous memory structure as 1 and storing it in the Hash table and writing 1 into Lock_Result of the main memory according to the return physical address in the Lock data structure;

340. Process querying Lock_Result periodically, if the read Lock_Result is equal to 0, it meaning an unsuccessful lock, then querying once again after a delay; if the read Lock-Result is equal to 1, it meaning a successful lock, then quitting the Lock calling.

Every time the Lock is called by a process, the 4 steps above mentioned will be executed.

The data structure of the Unlock primitive supported by the synchronous memory structure in the synchronous engine according to the invention is {Objective Address}, and only one element in the data structure represents the variable address needed for unlocking. The process only needs to transmit primitive's data structure into the synchronous engine, and then it may quit the Unlock calling. While the synchronous engine hardware, after it has received the Unlock data structure, reads the synchronous data structure from the Hash table according to the objective address, and reset the L bit. If the synchronous data structures are 0 after the reset of L bit, then release this synchronous data structure in the Hash table, otherwise write back the data structure after the resetting of L bit.

Figure 11:
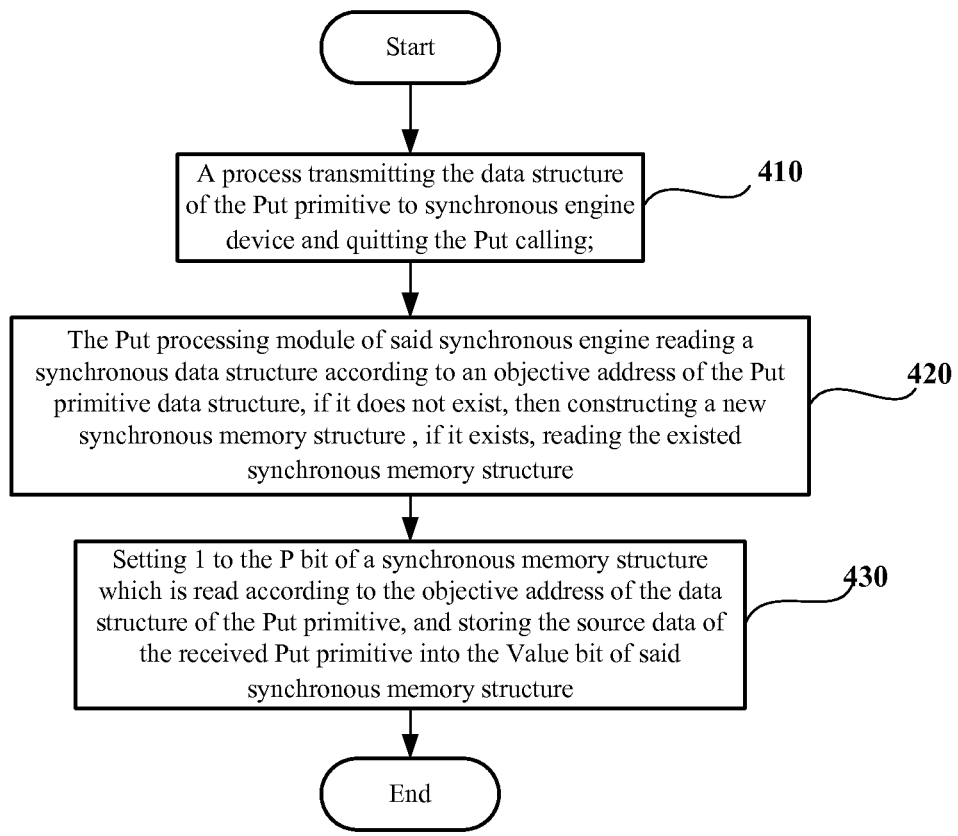
FIG. 11 is a flowchart of steps of supporting the Put primitives by synchronous memory structure in synchronous engine according to the invention.

4. The Put primitive data structure supported by the synchronous memory structure in the synchronous engine according to the invention is {Objective Physical Address, Source Data}, wherein each element in the data structure has the following meaning: the objective address represents the physical address where the source data of the Put primitive is stored; the source data represents the data content moving in the Put primitive. FIG. 11 is a flowchart of steps of supporting the Put primitives by the synchronous memory structure in synchronous engine according to the invention, as shown in FIG. 11, the method including the following steps:

410. A process transmitting the data structure of the Put primitive to the synchronous engine and then quitting the Put calling;

420. The Put processing module of the synchronous engine reading a synchronous memory structure from the Hash table shown in FIG. 4 according to the objective address of the data structure of Put primitive, if it does not exist, establishing a new synchronous memory structure; if it exists, then reading the existed synchronous memory structure.

430. Setting 1 to the P bit of the acquired synchronous memory structure in the step 420, and saving the source data in the received Put primitive into the Value bit of the synchronous memory structure.

Figure 12:
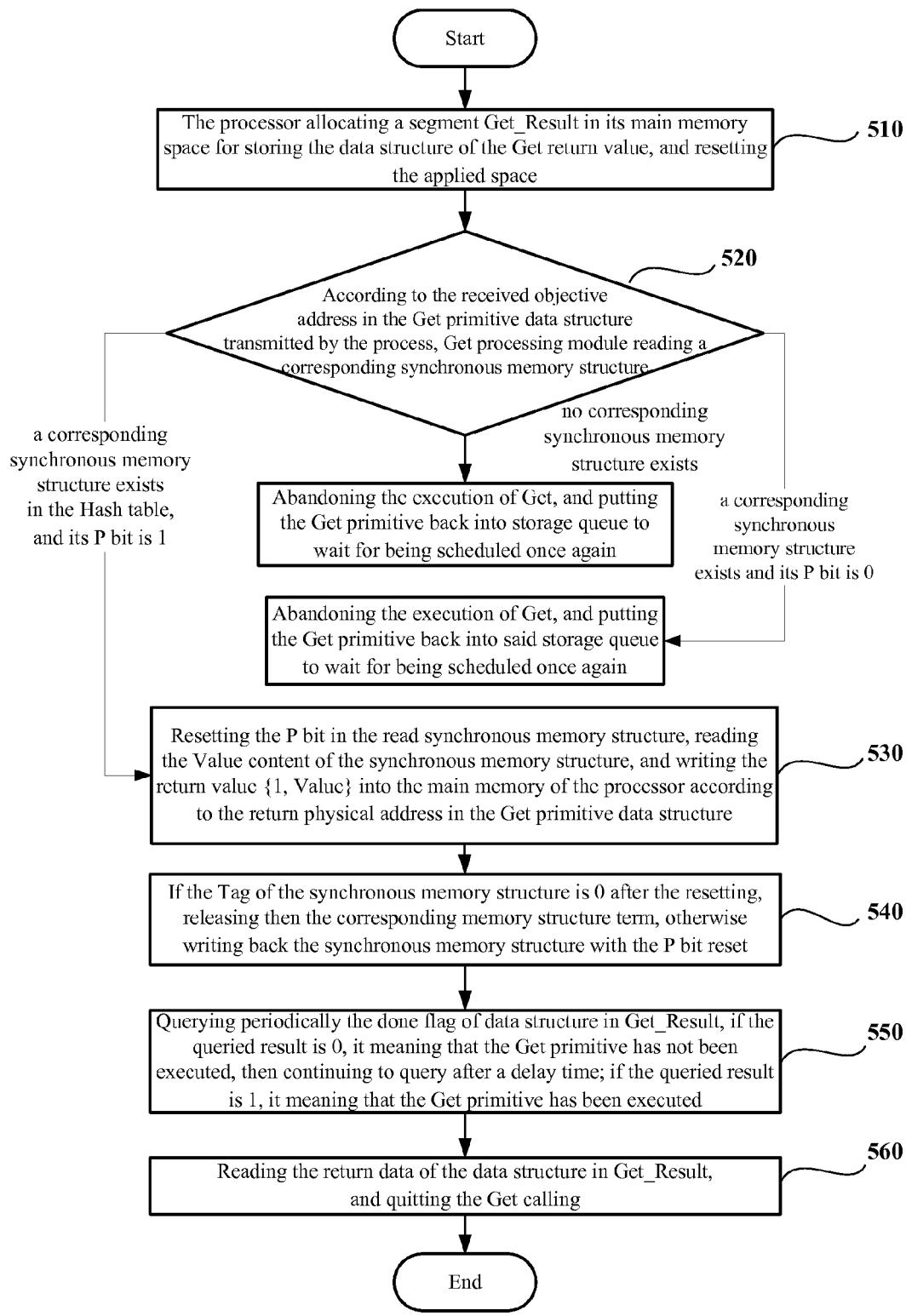
FIG. 12 is a flowchart of steps of supporting the Get primitives by synchronous memory structure in synchronous engine according to the invention.

5. The Get primitive data structure supported by the synchronous memory structure in the synchronous engine according to the invention is {Return Physical Address, Objective Physical Address}. Each element of the data structure has the following meaning: The return physical address is the storage address for the data returning to Get and a done flag after the Get has been successfully executed. The data structure of the Get return value is {Return data, Done flag}, and this return value is saved continuously in the return physical address. The objective physical address represents the physical address which the Get intends to acquire. FIG. 12 is a step flowchart of supporting the Get primitives by the synchronous memory structure in synchronous engine according to the invention, as shown in FIG. 12, the method including the following steps:

510. The processor allocating a segment Get_Result in its main memory space for storing the data structure of the Get return value, and resetting the applied space;

The process transmits the Get primitive data structure into the synchronous engine;

520. According to the received objective address in the Get primitive data structure, Get processing module reading a corresponding synchronous memory structure from the Hash table shown in FIG. 6, if there is no corresponding synchronous memory structure in the Hash table, then abandoning the execution of Get, and putting the Get primitive back into a storage queue to wait for being scheduled again; if there exist a corresponding synchronous memory structure in the Hash table and its P bit is 0, then abandoning the execution of Get, and putting the Get primitive back into a storage queue to wait for being scheduled again; if a corresponding synchronous memory structure exists in the Hash table and its P bit is 1, then executing the next step 540;

530. Resetting the P bit in the read synchronous memory structure, reading the Value content of the synchronous memory structure, and writing the return value {1, Value} into the main memory of the processor according to the return physical address in the Get primitive data structure;

540. If the Tag of the synchronous memory structure is zero after the resetting, releasing then the corresponding memory structure term in the Hash table, otherwise writing back the synchronous memory structure with the reset P bit;

Although the Get has reset the P bit, the corresponding line of the synchronous memory structure may still be used for achieving other purposes, such as if its L bit is set to 1, it represents that this line of the synchronous memory structure is still locked, then it is impossible to release this line of the synchronous memory structure. Only all Tags are 0, will this line of data be useless.

550. Querying periodically the done flag of data structure in Get_Result, if the queried result is 0, it meaning that the Get primitive has not been executed, then continuing to query after a delay time; if the queried result is 1, it meaning that the Get primitive has been executed, and then executing the nest step 560;

560. Reading the return data of the data structure in Get Result, and quitting Get calling.

Figure 13:
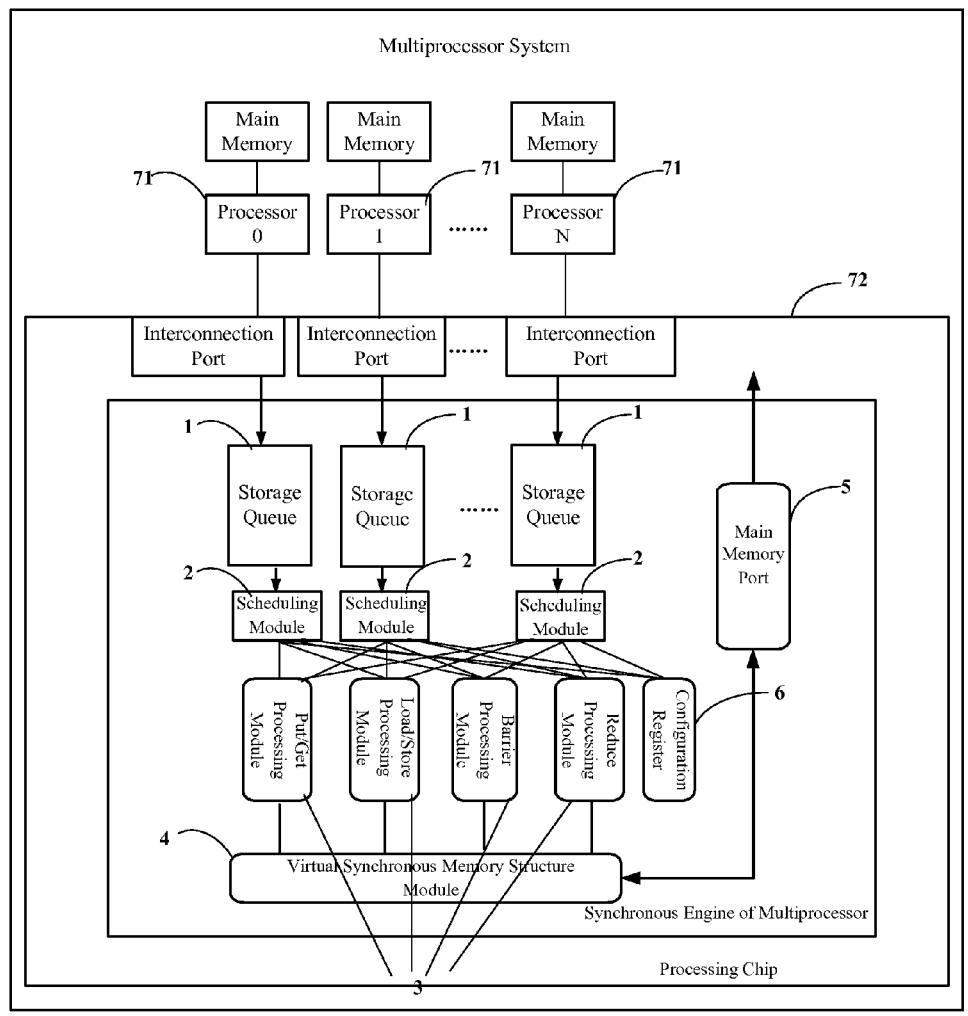
FIG. 13 is a diagram of the structure of the multiprocessor system according to the invention.

Corresponding to the synchronous engine of multiprocessor of the invention, it also provides a multiprocessor system. FIG. 13 is a diagram of the structure of the multiprocessor system according to the invention, as shown in FIG. 12, the system 7 including: A plurality of processors 71 and a processing chip 72, wherein the processing chip 72 includes:

A plurality of equipment ports 721, are configured to interconnect with a plurality of processors in high speed, wherein each processor connects with an equipment port;

the synchronous engine, is configured to interconnect with a plurality of equipment ports inside the chip.

FIG. 12 shows a topological structure of the synchronous engine in the case of n processors. N equipment ports are configured to interconnect at high speed with processors in one chip, wherein each processor is connected with an equipment port. During the process of device recognition, each processor may find the equipment port interconnecting thereto through a standard device searching procedure, and allocate various resources applied by equipment port, mainly the address space resources. A plurality of equipment ports inside the chip all interconnect with the synchronous engine and the resources which the synchronous engine requires are applied by the equipment port to the operating system which is over the processor. The operating system allocates the resources to corresponding equipment ports, and that is allocating the resources to the synchronous engine in fact. Meanwhile, the synchronous engine also maps its own resource to a corresponding operating system through equipment ports. Since the synchronous engine maps itself to the operating system which is over the n processors through n equipment ports, all the software in the n processors may operate the synchronous engine, just like operating exclusive resources, through a mapping relation, therefore the synchronous engine is actually shared by n processors.

The beneficial effect of the invention is: the synchronous engine according to the invention uses a unified shared memory structure to support and accelerate the basic primitives such as Barrier, Lock/Unlock, Reduce, Put/Get etc., raises greatly the execution speed of synchronization primitives, decreases the communication amount among processes, and simplify the interface of the synchronization primitives, without relying on the Cache coherence of multiprocessor and special instruction sets of processor, thus makes the parallel programs use synchronization primitives more easily, having the features of easy use, broader application and quick execution speed.

Through the description of the embodiments according to the invention in accompaniment with the attached drawings, the other aspects and features of the invention will be obvious to those skilled in the art.

Although concrete embodiments according to the invention have been described and explained above, those embodiments may be considered as examples and won't be used to limit the present invention, and the invention should be interpreted by the attached claims.

The invention claimed is:

1. A synchronous engine device of multiprocessor, characterized in that the synchronous engine device includes:
   a plurality of storage queues, being configured to receive synchronization primitives transmitted by a plurality of processors, wherein one of the queues stores all synchronization primitives from one of the processors;
   a plurality of scheduling modules, being configured to select the synchronization primitives for execution from the plurality of storage queues and then according to the type of the synchronization primitive transmitting the selected synchronization primitives to corresponding processing modules for processing, the scheduling modules corresponding in a one-to-one relationship with the storage queues;
   a plurality of processing modules, being configured to receive the synchronization primitives transmitted by the scheduling modules to execute different functions;
   a virtual synchronous memory structure module, using small memory space and mapping main memory spaces of all processors into a synchronization memory structure to realize the function of all synchronization primitives through a control logic;
   a main memory port, being configured to communicate with the virtual synchronous memory structure module to read and write the main memory of all processors and initiate an interrupt request to the processors;
   a configuration register, being configured to store various configuration information required by the processing modules.

2. The synchronous engine device of multiprocessor according to claim 1, characterized in that at the time of saving synchronization primitive into corresponding storage queues, a process ID is also stored in order to distinguish primitives coming from different processes in the same processor from each other.

3. The synchronous engine device of multiprocessor according to claim 1, characterized in that the processing module includes: Reduce processing module, Barrier processing module, Load/Store processing module, and Put/Get processing module.

4. The synchronous engine device of multiprocessor according to claim 1, wherein the processing module of synchronous engine device is expandable according to the type of synchronization primitive supported by synchronous engine device.

5. The synchronous engine device of multiprocessor according to claim 1, characterized in that a synchronous memory structure is virtualized by using of a small amount of on-chip memories, and does not occupy the main memory spaces of processors.

6. The synchronous engine device of multiprocessor according to claim 1, characterized in that a synchronous memory structure is {Count, P, L, Value}, and the {Count, P, L} is called the Tag of synchronous memory, wherein the bit width of the Count and the Value are set according to different requirements of the system;
   wherein
   Value: a memory unit, is configured to store data;
   L: the Lock flag bit, is configured to support the Lock/Unlock primitives;
   P: the Produce flag bit, is configured to realize Put/Get primitives, and
   Count: a counter, is configured to realize Barrier primitives, Reduce primitives, and a plurality of modes of Put/Get primitives, wherein the bit width of the counter is related with the maximal number of the parallel processes supported by the synchronous engine device, and an n-bit Count supports $2^n$ processes in maximum.

7. The synchronous engine device of multiprocessor according to claim 1, characterized in that the virtual synchronous memory structure module is configured to perform:
   using an on-chip memory as a Hash table, wherein each term in the Hash table has a structure {key value, Tag, Value}, and when a processing module writes a term of a synchronous memory structure, the processing module executing an instruction, and putting the address of the instruction as a key value to use the Hash algorithm to select a line in the Hash table as the memory unit, and storing the synchronous memory structure;
   when the processing module reads a synchronous structure, also using the Hash algorithm to find the term corresponding to the address, and the Hash table outputting the content of the found line {Tag, Value};
   if during the read process no corresponding term has been found using the Hash algorithm, it meaning that the execution of the current instruction should be postponed, then returning the instruction to the corresponding storage queue to wait for being scheduled again;
   after the synchronization primitive has been executed, if the executed results of the Tag of the synchronous memory structure are equal to 0, it meaning that this term of synchronous memory structure has been completely executed, then releasing the corresponding memory space of the Hash table;
   when the Hash table is overflowed, then using the main memory port to initiate an interruption to the corresponding processor, constructing a Hash table in a main memory of the processor to store the synchronous memory structure;
   wherein {Count, P, L} is called the Tag of synchronous memory; and Value is a memory unit, being configured to store data;

L: the Lock flag bit, is configured to support the Lock/Unlock primitives;

P: the Produce flag bit, is configured to realize Put/Get primitives, and

Count: a counter, is configured to realize Barrier primitives, Reduce primitives, and a plurality of modes of Put/Get primitives, wherein the bit width of the counter is related with the maximal number of the parallel processes supported by the synchronous engine device, and an n-bit Count supports $2^n$ processes in maximum.

8. A multiprocessor system of the synchronous engine device of multiprocessor according to one of claims 1 to 7, characterized in that the system includes:

a plurality of processors and a processing chip, wherein the processing chip includes: a plurality of equipment ports, being configured to interconnect at high speed with the plurality of processors, each processor connecting with an equipment port;

the synchronous engine device, wherein the storage queues interconnect with a plurality of equipment ports;

during a process of device recognition, each processor finds the corresponding equipment port through a standard device searching procedure, and allocates various resources requested by the equipment port;

the synchronous engine device maps its own resources into operation system of the processor through interconnection port and software on a plurality of processors and operates synchronous engine device through such mapping relation, as a result, synchronous engine device is shared by a plurality of processors.

9. A processing method for Barrier primitives of the synchronous engine device for the multiprocessor according to claim 1, characterized in that the method includes the following steps:

110) initializing the synchronous engine device system: allocating a plurality of continuous addresses to synchronous memory structures as a plurality of Barrier variables, meanwhile maintaining a register named Barrier_HW_State to indicate a done state of a plurality of Barrier variables, wherein each processor allocates a segment of space in its main memory as Barrier_State, which is an indication of the done state for Barrier;

120) N processes calling Barrier primitive, and using the Barrier variable to execute one Barrier operation, meanwhile the $n^{th}$ process saving the state of the $n^{th}$ bit of Barrier_State into its local variable Local_Barrier_State, N and n being positive integers;

130) after receiving a Store instruction to the Barrier variable, the synchronous engine device writing a value into the Barrier variable according to a physical address of Store, wherein the value equals to N−1;

140) Barrier processing module reading the synchronous memory structure of corresponding address, if the synchronous memory structure does not exist, or if the Count in the synchronous memory structure is read as 0, then constructing a synchronous memory structure, in which the Count is of the value of Store, and if the Count in the synchronous memory structure does not equal 0, then executing a next step 150;

150) the Barrier processing module reading the synchronous memory structure from corresponding address, and subtracting 1 from the Count of the read synchronous memory structure;

160) judging if the Count is equal to 0, if yes, it indicating that all processes have reached at the synchronization point and one Barrier has been finished, then reversing a corresponding bit of Barrier_HW_State, and broadcasting Barrier_HW_State to the positions of Barrier_State of a plurality of processors; otherwise, returning to step 150;

170) after transmitting the Store instruction, each the process querying periodically the value of the $n^{th}$ bit of Barrier_State subordinate to the present processor, if the queried value is equal to the value of Local_Barrier_State, it meaning that the Barrier of the present process has not been finished, then querying once again later; if the queried value does not equal Local_Barrier_State, it meaning that the Barrier has been finished, then the process quitting the query state, and quitting the Barrier primitive calling at the same time; wherein the Count is the counter.

10. The processing method for the Barrier primitives of the synchronous engine device of the multiprocessor according to claim 9, characterized in that the initializing step 110 for the synchronous engine device system includes the following steps:

111) allocating a plurality of continuous addresses to synchronous memory structures as a plurality of Barrier variables, and writing pointed information into the configuration register;

112) maintaining a register named Barrier_HW_State to indicate a done state of a plurality of Barrier variables in synchronous engine device, wherein each bit corresponds to a done state of a Barrier variable;

113) each processor allocating a segment of space in its main memory as Barrier_State to indicate the done state for Barrier, wherein each processor's Barrier_State is initialized into 0, and Barrier_State is shared and read by each process inside the corresponding processor;

114) each processor transmitting the physical address of the applied Barrier_State to the configuration register.

11. A processing method for Reduce primitives for synchronous engine device of the multiprocessor according to claim 1, characterized in that the method includes the following steps:

210) initializing the synchronous engine device system: allocating a plurality of continuous addresses to synchronous memory structures as a plurality of Reduce variables, meanwhile maintaining a register named Reduce_HW_State to indicate a done state of a plurality of Reduce variables, and each processor allocating a segment of space in its main memory as Reduce_State, which is an indication of the done state for Reduce;

220) N processes calling Reduce primitives, and using the Reduce variable Rn to execute one Barrier operation, wherein each process saves the state of the $n^{th}$ bit of Reduce_State of the processor into a local variable Local_Reduce_State, N and n are positive integers;

230) each process which participates in the Reduce, transmitting the data structure of the Reduce primitive into the synchronous engine device; after receiving the data structure of the Reduce, the synchronous engine device writing a value to the Reduce Variable Rn according to the physical address of Reduce, where the value is equal to N−1;

240) the Reduce processing module reading the synchronous memory structure of corresponding address, if the synchronous memory structure does not exist, or if the Count in the synchronous memory structure has been read as 0, then constructing a synchronous memory structure, in which the Count is of the value N−1, and saving the source data in the Reduce data structure into the Value of the synchronous memory structure; if the read Count in the synchronous memory structure does not equal 0, then executing the next step 250;

250) the Reduce processing module reading the synchronous memory structure of corresponding address, subtracting 1 from the corresponding Count, and operating the Value read from the synchronous memory structure with the source data in the Reduce data structure, then saving the results into the Value in the synchronous memory structure;

260) judging if the value of Count is equal to 0, if yes, it meaning that one Reduce has been finished, then reversing a corresponding bit in Reduce_HW_State, then broadcasting Reduce_HW_State to the positions of Reduce_State of n processors; otherwise, returning to step 250;

270) after transmitting the Reduce data structure, each the process querying periodically the value of the $n^{th}$ bit of Reduce_State subordinate to the present processor, if the queried state is equal to Local_Reduce_State, it meaning that the Reduce of the present process has not been finished, then querying once again later; if the queried state does not equal Local_Reduce_State, it meaning that the Reduce has been finished, then quitting the query state; where the Value is a memory unit; the Count is a counter.

12. The processing method for the Reduce primitives of the synchronous engine device of the multiprocessor according to claim 11, characterized in that the initialization step for the synchronous engine device system includes the following steps:

211) allocating a plurality of continuous addresses to synchronous memory structures {Count, P, L, Value} as a plurality of Reduce variables, and writing pointed information into a configuration register of the synchronous engine device;

212) maintaining a register Reduce_HW_State which indicates the done states of a plurality of Reduce variables in the synchronous engine device, wherein each bit corresponds to a done state of a Reduce variable;

213) each processor allocating a segment of space in its main memory as Reduce_State to indicate the done state for Reduce, where each processor's Reduce_State is initialized into 0;

214) each processor transmitting the physical address of the applied Reduce_State to the configuration register of the synchronous engine device;

wherein

Value: a memory unit, is configured to store data;

L: the Lock flag bit, is configured to support the Lock/Unlock primitives;

P: the Produce flag bit, is configured to realize Put/Get primitives, and

Count: a counter, is configured to realize Barrier primitives, Reduce primitives, and a plurality of modes of Put/Get primitives, wherein the bit width of the counter is related with the maximal number of the parallel processes supported by the synchronous engine device, and an n-bit Count supports $2^n$ processes in maximum.

13. The processing method for the Reduce primitives of the synchronous engine device of the multiprocessor according to claim 11, characterized in that the data structure of synchronous engine device is {Reduce Variable Address, Operator, Data Type, Process Number−1, Source Data}.

14. A processing method for Lock primitives for the synchronous engine device of the multiprocessor according to claim 1, characterized in that the processing method includes the following steps:

310) each processor allocating a variable Lock_Result in its main memory, resetting the variable, and putting the physical address of the variable as a return physical address of the Lock primitive data structure;

320) the synchronous engine device, after having received the data structure of the Lock primitive transmitted by the process, reading the synchronous memory structure according to the objective physical address of the data structure, if it has not read the synchronous memory structure, or the L bit in the read synchronous structure is equal to 0, it meaning that the physical address has not been locked, then executing the Lock primitive, and turning to the next step 330, L being a Boolean type variable of a single bit;

if the L bit of the read synchronous memory structure is equal to 1, it meaning that the physical address has been locked, then abandoning the execution of the present Lock, and putting the Lock primitive corresponding storage queue to wait for being scheduled again;

330) setting the L bit of the synchronous memory structure as 1 and storing it, and writing 1 into Lock_Result of the main memory according to the returned physical address;

340) the process querying Lock_Result periodically, if the read Lock_Result is equal to 0, it meaning an unsuccessful lock, then a querying once again after a delay;

if the read Lock-Result is equal to 1, it meaning a successful lock, then quitting Lock calling, wherein L is the flag bit.

15. The processing method for the Lock primitives of the synchronous engine device of the multiprocessor according to claim 14, characterized in that the Lock primitive data structure is {Return Physical Address, Objective Physical Address}, wherein the return physical address represents that when it is successfully locked, the synchronous engine device will save the information of success into the return physical address of the main memory; the objective physical address expresses what physical address the software will lock.

16. A processing method for Unlock primitives for the synchronous engine device of the multiprocessor according to claim 1, characterized in that the method includes the following steps:

the process transmitting the data structure to the synchronous engine device and quitting an Unlock calling;

after receiving the Unlock data structure, the synchronous engine device, reading the synchronous data structure from a Hash table according to an objective address, and resetting the L bit, if the synchronous data structures all are 0 after the L bit is reset, then releasing this term of synchronous data structure, otherwise only writing back the data structure with the L bit being reset back, where L is the flag bit of Lock, L being a Boolean type variable of a single bit.

17. The processing method for the Unlock primitives of the synchronous engine device of the multiprocessor according to claim 16, characterized in that the Unlock primitive has the data structure of {Objective Address} and the only one element in the data structure expresses the variable address needed unlock.

18. A processing method for Put primitives for the synchronous engine device of the multiprocessor according to claim 1, characterized in that the method includes the following steps:

410) a process transmitting the data structure of the Put primitive to the synchronous engine device and quitting the Put calling;

420) the Put processing module of the synchronous engine device reading a corresponding synchronous data structure according to an objective address of the Put primitive data structure, if it does not exist, then constructing a new synchronous memory structure, if it exists, reading the existed synchronous memory structure;

430) setting 1 to the P bit of a corresponding synchronous memory structure which is read according to the objective address of the data structure of the Put primitive, and storing the source data of the received Put primitive into the Value bit of the synchronous memory structure, where P is a Boolean type variable of a single bit, the P bit is a flag bit of Produce; Value is a memory unit.

19. The processing method for Put primitive of the synchronous engine device of the multiprocessor according to claim 18, characterized in that the Put primitive data structure is {Objective Address, Source Data}, wherein the objective address expresses the physical address where the source data of the Put primitive is to be stored, and the source data expresses the data content moving in Put primitives.

20. A processing method for Get primitives for the synchronous engine device of the multiprocessor according to claim 1, characterized in that the method includes the following steps:

510) the processor allocating a segment Get_Result in its main memory space for storing the data structure of the Get return value, and resetting the applied space;

520) according to an objective address in the Get primitive data structure transmitted by the received process, the Get processing module reading a corresponding synchronous memory structure, if there is no corresponding synchronous memory structure, then abandoning the execution of the Get, and putting the Get primitive back into the storage queue to wait for being scheduled once again, if there exists a corresponding synchronous memory structure and its P bit is 0, then abandoning the execution of the Get, and putting the Get primitive back into the storage queue to wait for being scheduled once again, if a corresponding synchronous memory structure exists in the Hash table, and its P bit is 1, then executing the next step 530;

530) resetting the P bit in the read synchronous memory structure, reading the Value content of the synchronous memory structure, and writing the return value {1, Value} into the main memory of the processor according to the return address in the Get primitive data structure;

540) if the Tag of the synchronous memory structure is zero after the resetting, releasing then the corresponding memory structure term, otherwise writing back the synchronous memory structure with the P bit reset;

550) querying periodically the done flag of data structure in Get_Result, if the queried result is 0, it meaning that the Get primitive has not been executed, then continuing to query after a delay time; if the queried result is 1, it meaning that the Get primitive has been executed, and executing the nest step 560;

560) reading the return data of the data structure in Get_Result, and quitting the Get calling, where P is a flag bit of Produce; Value is a memory unit; {Count, P, L} is called the Tag of the synchronous memory;

wherein

Value: a memory unit, is configured to store data;

L: the Lock flag bit, is configured to support the Lock/Unlock primitives;

P: the Produce flag bit, is configured to realize Put/Get primitives, and

Count: a counter, is configured to realize Barrier primitives, Reduce primitives, and a plurality of modes of Put/Get primitives, wherein the bit width of the counter is related with the maximal number of the parallel processes supported by the synchronous engine device, and an n-bit Count supports $2^n$ processes in maximum.

21. The processing method for the Get primitives of the synchronous engine device of the multiprocessor according to claim 20, characterized in that the Get primitive data structure is {Return Physical Address, Objective Physical Address}, and the various elements in data structure have the following meanings: the return physical address is an address for storing the done flag and the data which returns to Get data after the Get has been executed successfully, and the data structure of the Get return value is {Return Data, Done Flag}, where the returned value is saved in the return physical address continuously; the objective address expresses the physical address of the data which Get intends to acquire.

* * * * *